(12) United States Patent
Nishida (10) Patent No.: US 8,052,181 B2
(45) Date of Patent: Nov. 8, 2011

(54) LATCH DEVICE AND OPENING AND CLOSING APPARATUS USING SAME

(75) Inventor: Ryuhei Nishida, Yokohama (JP)

(73) Assignee: Nifco Inc., Yokohama-Shi, Kanagawa (JP)

( * ) Notice: Subject to any disclaimer, the term of this patent is extended or adjusted under 35 U.S.C. 154(b) by 171 days.

(21) Appl. No.: 12/285,395

(22) Filed: Oct. 3, 2008

(65) Prior Publication Data

US 2009/0079205 A1 Mar. 26, 2009

Related U.S. Application Data

(63) Continuation of application No. PCT/JP2008/053296, filed on Feb. 26, 2008.

(30) Foreign Application Priority Data

Feb. 28, 2007 (JP) .................................. 2007-049066

(51) Int. Cl.
*E05B 63/20* (2006.01)
*E05B 63/00* (2006.01)

(52) U.S. Cl. ................................... 292/332; 292/DIG. 4

(58) Field of Classification Search .................. 292/332, 292/DIG. 4
See application file for complete search history.

(56) References Cited

U.S. PATENT DOCUMENTS

| 5,388,901 A * | 2/1995 | Asano | 312/222 |
| 5,520,313 A * | 5/1996 | Toshihide | 224/539 |
| 6,247,733 B1 * | 6/2001 | Weiland | 292/228 |
| 7,032,985 B1 * | 4/2006 | Ichioka et al. | 312/319.2 |
| 7,063,225 B2 * | 6/2006 | Fukuo | 220/264 |
| 7,064,285 B2 * | 6/2006 | Ichimaru | 200/293 |
| 7,231,692 B2 * | 6/2007 | Harada | 16/345 |
| 7,407,200 B2 * | 8/2008 | Ichimaru | 292/194 |
| 7,621,419 B2 * | 11/2009 | Fukuo | 220/264 |
| 2003/0071047 A1 * | 4/2003 | Harada | 220/835 |
| 2006/0208506 A1 * | 9/2006 | Kern et al. | 292/304 |

FOREIGN PATENT DOCUMENTS

| JP | U-H04-125383 | 11/1992 |
| JP | U-H05-85970 | 11/1993 |
| JP | H06-016091 | 1/1994 |
| JP | 06081533 A * | 3/1994 |
| JP | U H06-62161 | 9/1994 |
| JP | U-H06-71309 | 10/1994 |
| JP | H09-250268 | 9/1997 |
| JP | 2001-173300 | 6/2001 |
| JP | 2001-262915 | 9/2001 |
| JP | 2004-263461 | 9/2004 |

\* cited by examiner

*Primary Examiner* — Carlos Lugo
(74) *Attorney, Agent, or Firm* — Manabu Kanesaka (57) ABSTRACT

A push-push type latch device includes a cam member and a pin member provided respectively on a movable body and a main body for coupling and decoupling with the cam member. The latch device locks the movable body in a first position on the main body via a coupling of the pin member and the cam member, and releases the coupling by pushing from the first position and releasing a pushing force to switch to a second position. The cam member includes a divided body including a locking part for coupling with the pin member. When the divided body receives a load above a predetermined value through the pin member in a state when coupled with the pin member, the divided body rotates to release the coupling with the pin member with accompanying movement toward a direction to absorb the load.

6 Claims, 13 Drawing Sheets

LATCH DEVICE AND OPENING AND CLOSING APPARATUS USING SAME

CROSS REFERENCE TO RELATED APPLICATION

This is a continuation application of PCT Patent Application No. PCT/JP2008/053296 filed on Feb. 26, 2008.

BACKGROUND OF THE INVENTION AND RELATED ART STATEMENT

The present invention relates to a latch device which is used when coupling and decoupling (engaging and disengaging) a movable body on a main body, particularly a push-push type (this also may be called a push lock-push open type or alternating type) latch device, and an opening and closing apparatus using the same.

A push-push type latch device has a cam member and a pin member which couples and decouples with that cam member, respectively, provided in correspondence on the movable body and the main body, locks the movable body in a first position of the main body via the coupling of the pin member on the cam member, and releases said coupling by pushing from that first position and then releasing that pushing force to enable switching to a second position, and it is excellent in the point that locking and release can be accomplished by push operation of the movable body. Device structures are largely divided into swing type exemplified in FIGS. 12(a), 12(b), and heart cam type exemplified in FIGS. 13(a), 13(b).

Figure 12A:
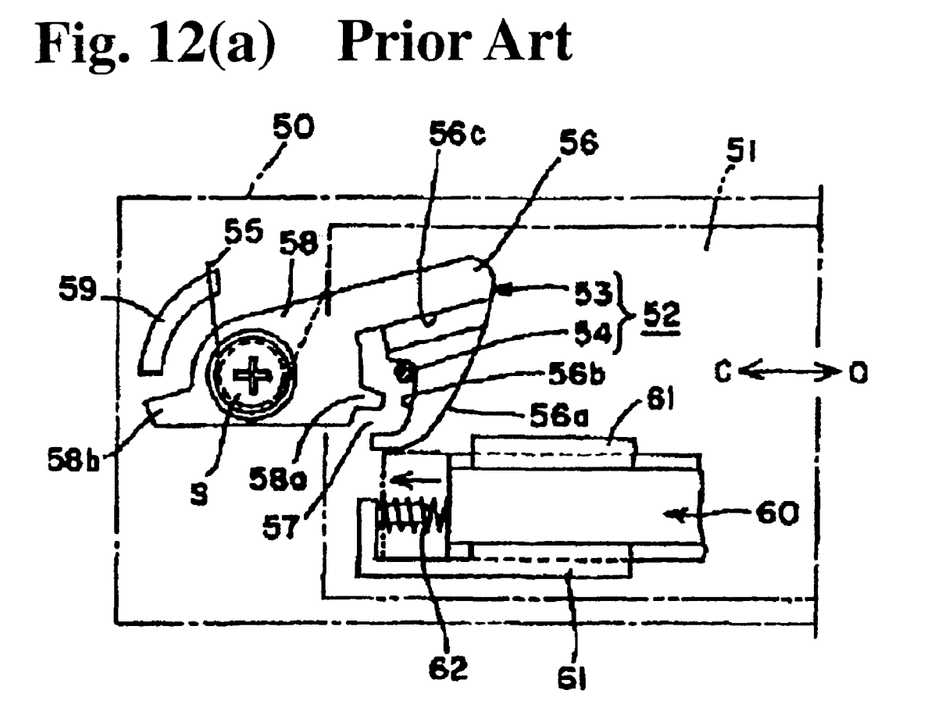
FIGS. 12(a), 12(b) are explanatory drawings showing a swing type latch device disclosed in Japanese Unexamined Patent Application Publication No. 2002-303070.
Figure 12B:
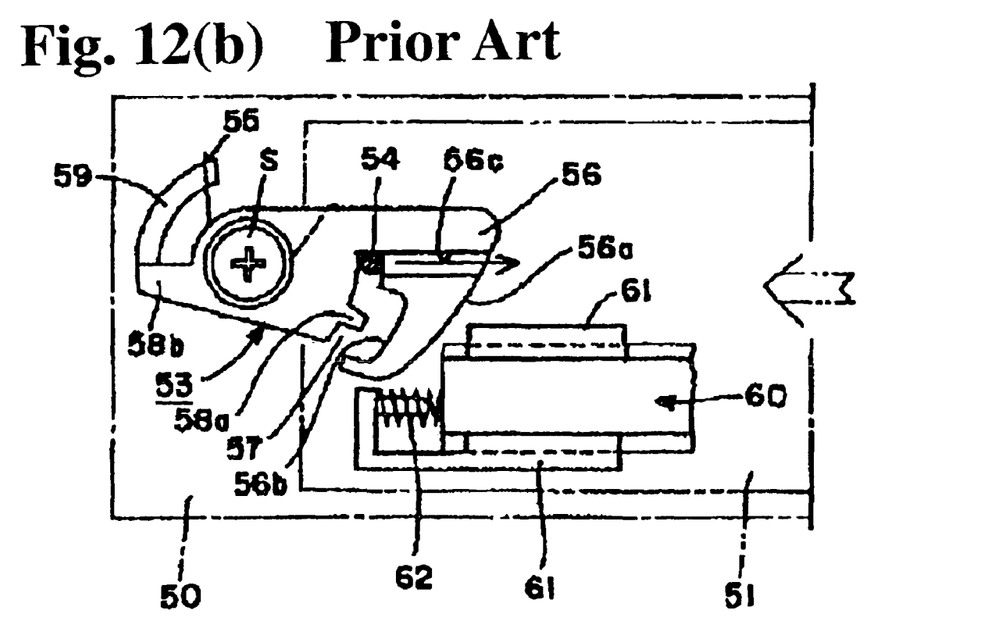

The latch device (lock device) in FIGS. 12(a), 12(b) is one which is given in Japanese Unexamined Patent Application Publication No. 2002-303070, and FIG. 12(a) shows the locked state, and FIG. 12(b) shows the unlocking process. In this example, the movable body 51 is a drawer, or the like, and it is pushed in toward the C direction being the stored side with respect to the case 50 in opposition to the impelling force of an impelling means not illustrated, and conversely is impelled to move toward the O direction being the side for use. The latch device 52 comprises a cam member 53 which is provided on the case 50, an impelling spring 55 which impels that cam member 53, and a pin member 54 which is provided on the movable body 51, and it locks the movable body 51 in the stored position by push operation, and releases that locking by the next push operation.

Here, the cam member 53 comprises a front piece 56 and a rear piece 58 which is spaced by a vertical slit 57. The front piece 56 has a sloping cam face 56a which forms a front end edge, a locking cam groove 56b which is provided on a part of the rear end edge, and a straight sloping cam groove 56c for releasing which extends in the front-back direction. The rear piece 58 has a shaft attachment hole, a projection 58a which projects out from the front end edge toward the cam groove 56b, and a contact projection 58b which is placed projecting on the rear edge part. Also, the cam member 53 is pivotally supported on the side of the case 50 to be capable of rotating via a shaft S. The impelling spring 55 has one end fixed to the cam member 53 and the other end fixed to a stopper 59 which is placed to project on the side of the case 50, and in that state it is impelled to rotate in the clockwise direction by the impelling means 55 until the contact projection 58b strikes the corresponding end of the stopper 59.

The operating characteristic is that when pushing the movable body 51 into the case 50 by push operation, the pin member 54 strikes the sloping cam face 56a, and then enters as far as the cam groove 56b while making the cam member 53 rotate counterclockwise in opposition to the impelling spring 55 with the shaft S as fulcrum. When the pushing force is released, the cam member 53 rotates clockwise by the impelling force, and the pin member 54 is coupled in the inside angle part of the cam groove 56b. The movable body 51 is locked in the stored position by that coupling. When drawing the movable body 51 from the case 50, in case the movable body 51 is pushed, the pin member 54 moves from the cam groove 56b to the straight sloping cam groove 56c as in FIG. 12(b) with accompanying clockwise rotation of the cam member 53. When the push operation is released, the pin member 54 moves following the straight sloping cam groove 56c, and at the same time, the movable body 51 is moved toward the projecting direction by the impelling force. The symbol 60 is an inertial stopper which is guided by a guide 61 and is pushed forward by a spring 62. When the movable body 51 receives inertial force the same as push operation in the stored position, the inertial stopper 60 progresses backward in opposition to the spring 62, and as in FIG. 12(a) it approaches the corresponding side part of the cam member 53 whereby it disables rotation of the cam member 53 toward the unlocking direction.

Figure 13A:
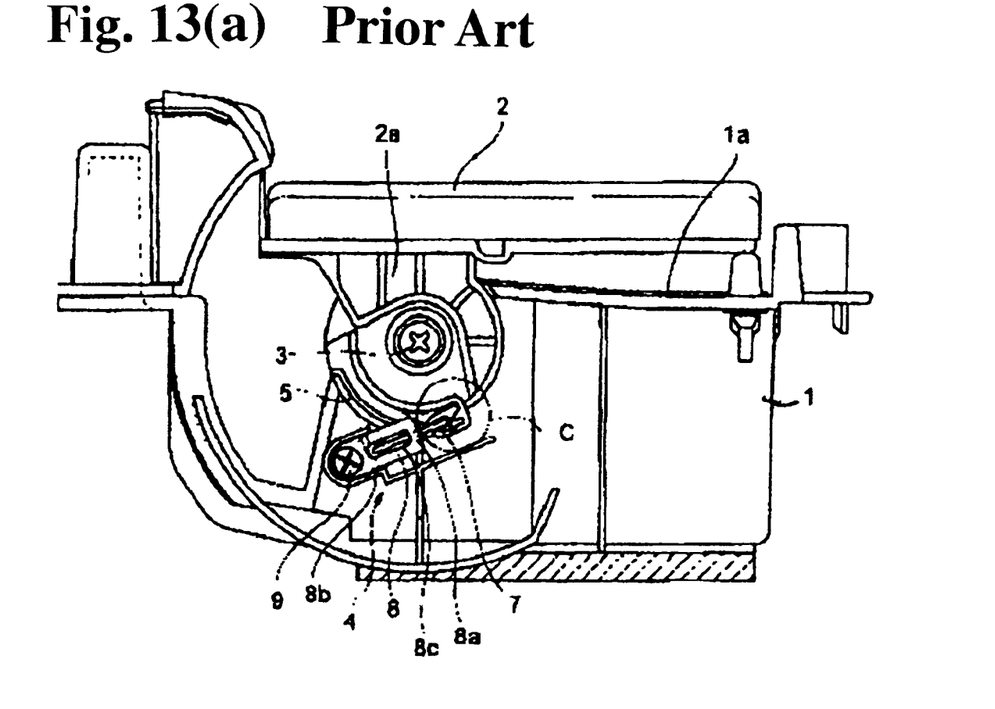
FIGS. 13(a), 13(b) are explanatory drawings showing a latch device that copes with the improper excessive load disclosed in Patent Document 1.
Figure 13B:
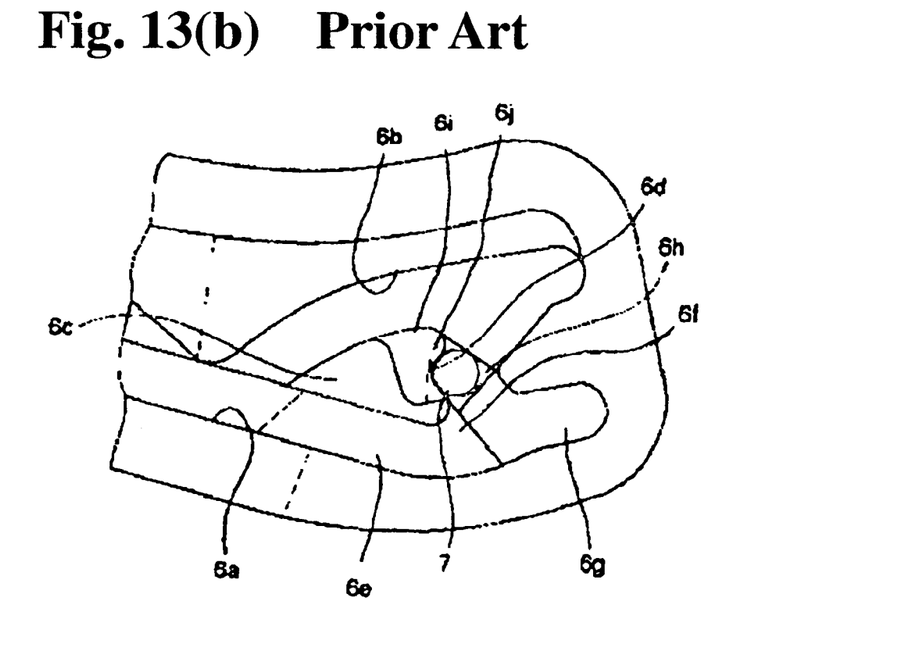

The latch device (latch means) in FIGS. 13(a), 13(b) is one which is disclosed in Patent Document 1 (Japanese Patent No. 3671824), and FIG. 13(a) shows the entirety of the latch device in the cover closed state, and FIG. 13(b) shows the essential parts of the cam member. In this example, the cover 2 is rotated toward the closed direction on the box 1 in opposition to the impelling force of an impelling means and is locked in the closed direction via the latch device 4. The latch device 4 has a heart-shaped cam 6c which is provided on the side of the box 1, and a pin member (movable pin) 54 which is provided on the side of the cover 2, and it is similar to the spring type in the point that the cover 2 is locked in the closed position by push operation, and that locking is released by the next push operation.

In the latch device as above, when an excessive load in an improper direction (for example, excessive load due to forcefully pushing the hinge side of the cover or forcefully prying open the open end side of the cover) is received with the cam member and the pin member coupled, that is, in the cover closed state, the tip of the pin member 54 which is in the coupled position is pushed up from the cam groove and comes off from the cam, and the cover easily becomes left open or left closed. Also, the cam part may become abraded and the coupling position with the pin member may shift and the feeling of operation may become worse, moreover when it is unlocked forcefully, it may cause deformation, breakage or falling off of the pin member, as well as an uncomfortable noise.

Therefore, in the latch device in Patent Document 1, a countermeasure as follows is adopted. That is, in this structure, it is constituted by a heart-shaped cam 6c having a first cam groove 6a, a second cam groove 6b, and a locking recessed part 6d, and a pin member 7 of which the tip part is coupled in the locking recessed part 6d while sliding in said first and second cam grooves. In the vicinity of the locking recessed part 6d of the heart-shaped cam 6c, there is formed a beveled part 6i, or the like, where the tip of the pin member 7 springs out to the side of the first cam groove 6a or the second cam groove 6b when forceful pushing-up force acts on the tip part of the pin member 7 locked in the locking recessed part 6d.

With the above countermeasure of the past, although the beveled part or a sloping face is formed in the vicinity of the locking recessed part on the cam side and it is made as a structure in which the pin member easily comes out from the locking recessed part to the side of the first cam groove or the second cam groove via the beveled part or sloping face, it is still not satisfactory in terms of aspects as followings. That is, in the countermeasure of the past, the coupling force between the pin member and the locking recessed part, that is, the locking force on the cover, becomes weak and tends to become irregular, and the locking ability becomes worse due to that. Moreover, through continued use, the position of the locking part for locking with the pin member shifts and the locking position of the cover also tends to shift, and the quality cannot be maintained.

Therefore, the purpose of the present invention is to improve the quality and reliability in a swing type or heart cam type latch device, by making it such that the locking part for locking with the pin member is moved to be capable of returning inside the cam member when excessive load in the improper direction is received, so that it does not become abraded or cause a breakage as noted above, and moreover the locking force on the movable body can be kept constant whereby the occurrence of malfunction is suppressed.

Further objects and advantages of the invention will be apparent from the following description of the invention.

SUMMARY OF THE INVENTION

In order to achieve the above purpose, in a first aspect of the present invention, in a push-push type latch device, which has a cam member and a pin member which couples and decouples with the cam member, respectively being provided in correspondence on a movable body and a main body, locks said movable body in a first position on said main body via the coupling of said pin member on said cam member, and releases said coupling by pushing from the first position and then releasing the pushing force to enable switching to a second position. The cam member has a divided body having divided places including a locking part which couples with said pin member, and when said divided body receives a load at or above a fixed value via said pin member in a state when coupled with said pin member, it becomes capable of releasing the coupling with said pin member with accompanying movement toward a direction to absorb that load.

In the above invention, the latch device if it is a push-push type is not limited to the heart cam type given in the embodiment, and it also may be a swing type as exemplified in FIGS. 12(a), 12(b). It becomes necessary for the cam member to have a divided body having divided places including a locking part (locking recessed part in the example, cam groove 56b in the case of the swing type in FIGS. 12(a), 12(b)) which couples with the pin member. Even if this divided part is not constituted such that it divides the main parts of the heart cam from the base as in the embodiment, for example, in the case of heart cam type, it also may be made so as to divide only the heart cam (the part called heart-shaped protruding part or island) from the base. Also, as for the first position and second position of the main body, for example, if the movable body is a cover as in FIGS. 13(a), 13(b), then one side becomes the open position and the other side becomes the closed position, and if the movable body is a drawer body as in FIGS. 12(a), 12(b), then one side becomes the drawn position and the other side becomes the stored position.

It is more preferable that the present invention above is embodied as follows.

(a) It is constituted such that said cam member has a movement restricting means which enables moving said divided body from a normal position when receiving said load at or above a fixed value, and an impelling means which enables returning said divided body again to said normal position after releasing the coupling with said pin member (a second aspect of the present invention).

(b) It is constituted such that said cam member has said divided body and a base which supports the divided body so as to be capable of rotation (a third aspect of the present invention).

(c) It is constituted such that said cam member has a shaft part which is projected out on the bottom face of said divided body and is run through a support hole provided on said base, a linkage plate which is fixed on the leading end side of the shaft part and is rotated as one with the shaft part, and an impelling means which is disposed between the bottom face of said base and said linkage plate and impels said divided body toward the side of said base to absorb play in the axial direction (a fourth aspect of the present invention).

(d) It is constituted such that said impelling means serves as the impelling means according to the second aspect of the present invention, that is, an impelling means which enables returning said divided body again to said normal position after releasing the coupling with said pin member (a fifth aspect of the present invention).

Compared to the aspects of the invention stated above, in a sixth aspect of the present invention, it is embodied as an apparatus for opening and closing a movable body. The opening and closing apparatus, which switches a movable body on a main body to an open position or a closed position by push operation in opposition to an impelling force in mid course and locks in the closed position via a latch device, employs the latch device in any of the first through fifth aspects of the present invention as said latch device.

In the first aspect of the present invention, when the locking part (the divided body including the locking part) receives a load at or above a fixed value toward the improper direction via the pin member in a state when the pin member is locked in the locking part (the locked state of the latch device), the coupling with the pin member is released with accompanying movement toward a direction to absorb that load. Therefore, in this structure, compared with the countermeasure of the past, there is no abrasion or breakage, moreover failures such as shifting of the position of the locking part which couples with the pin member also can be assuredly eliminated.

In the second aspect of the present invention, because the divided body is moved via the movement restricting means and is returned again to the normal position by the impelling force of the impelling means after moving, it always operates stably as a countermeasure for the forcing excessive load even when used continuously, whereby the occurrence of malfunctions is suppressed and the quality and reliability can be improved.

In the third aspect of the present invention, by the fact that the divided body is supported on the base to be capable of rotation, for example, as the constitution which "enables releasing the coupling with said pin member with accompanying movement toward a direction to absorb that load" in the first aspect of the present invention, or the constitution of the "movement restricting means" in the second aspect of the present invention, it can be implemented simply by mutually fitting recession and protrusion, or the like, being provided in the circumferential direction.

In the invention of the fourth aspect of the present invention, while the divided body is supported on the base to be capable of rotation, play of the divided body is absorbed by the impelling means whereby it is made easier to keep it as one body. In this case, in the fifth aspect of the present invention, simplification can be realized by further restraining the number of members.

In the sixth aspect of the present invention, an opening and closing apparatus endowed with advantages as above is provided, whereby the reliability of the opening and closing apparatus can be improved.

BRIEF DESCRIPTIONS OF THE DRAWINGS

FIGS. 9(a), 9(b) show the base unit of the above latch device, wherein

FIGS. 10(a), 10(b), 10(c), 10(d) show the divided body unit of the above latch device, wherein

FIGS. 11(a), 11(b), 11(c), 11(d) show the linkage plate unit of the above latch device, wherein

DETAILED DESCRIPTION OF PREFERRED EMBODIMENTS

Figure 1:
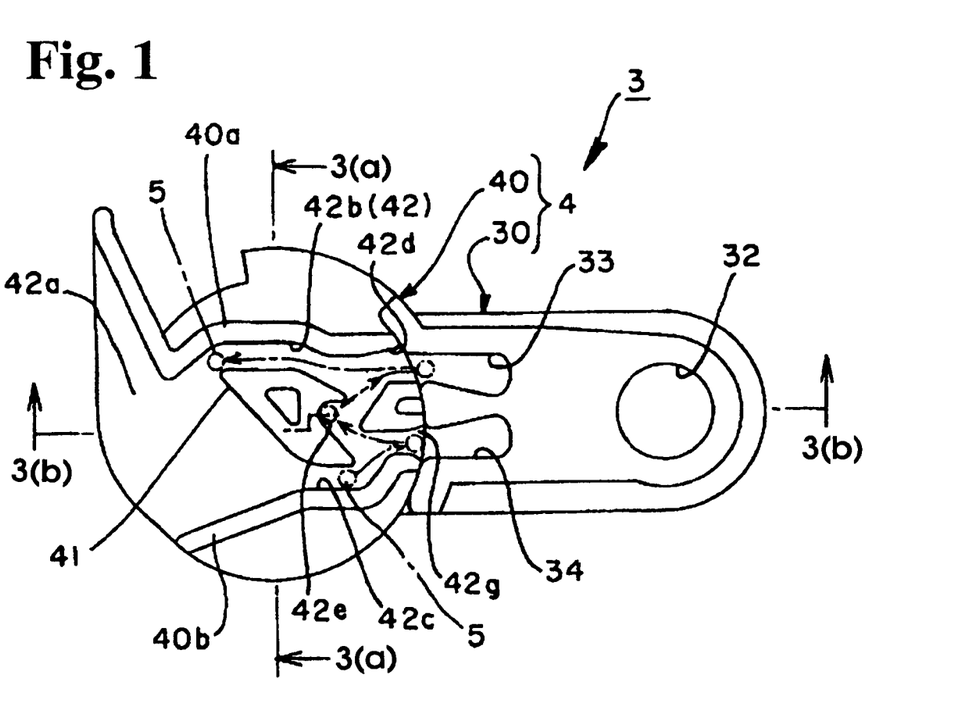
FIG. 1 is a top view showing the normal manner of a latch device of an embodiment of the present invention.
Figure 2A:
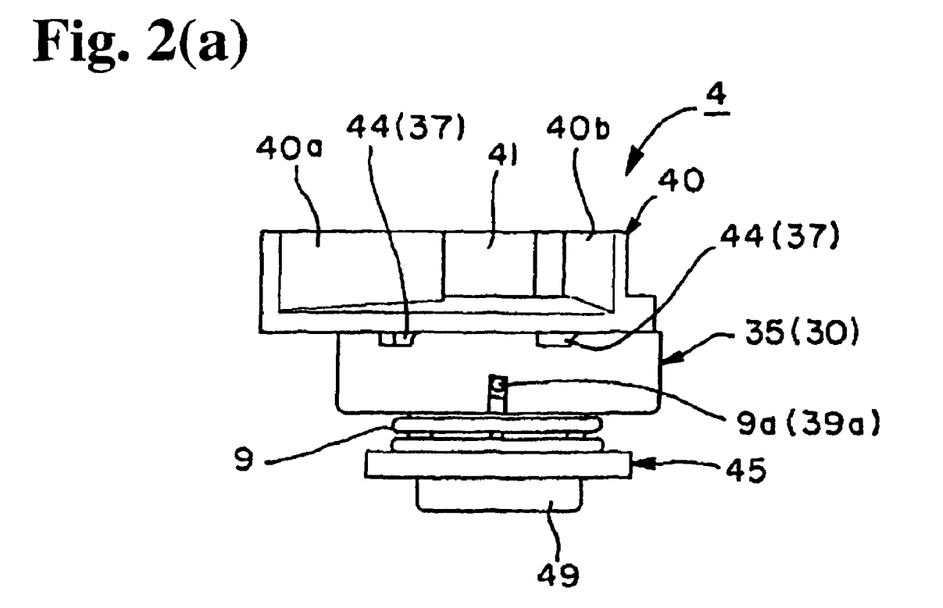
FIG. 2(a) is a left side view of the above latch device.
Figure 2B:
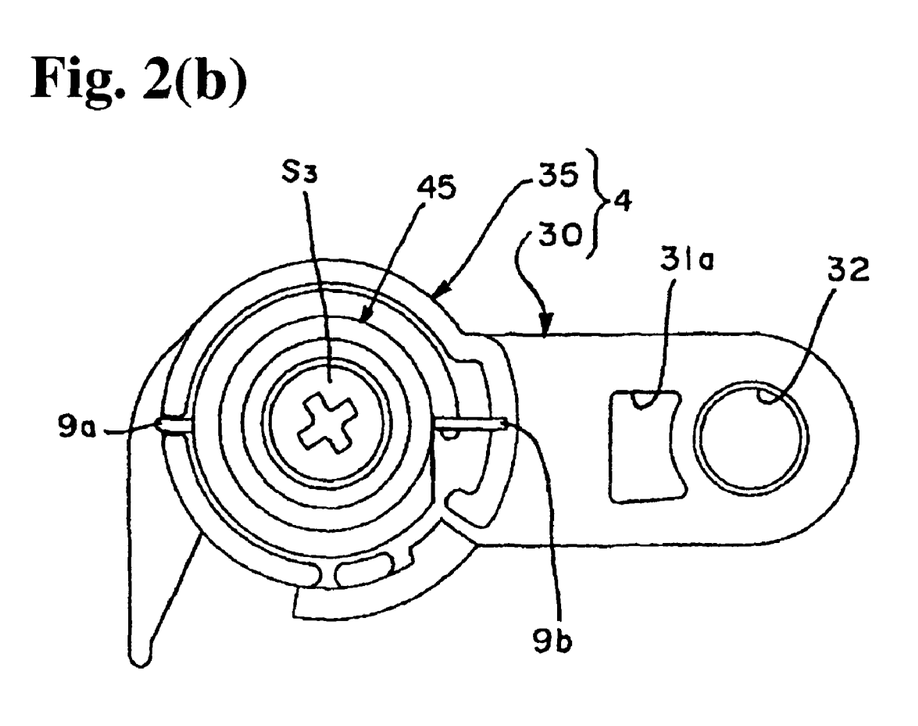
FIG. 2(b) is a bottom view of the same.
Figure 3A:
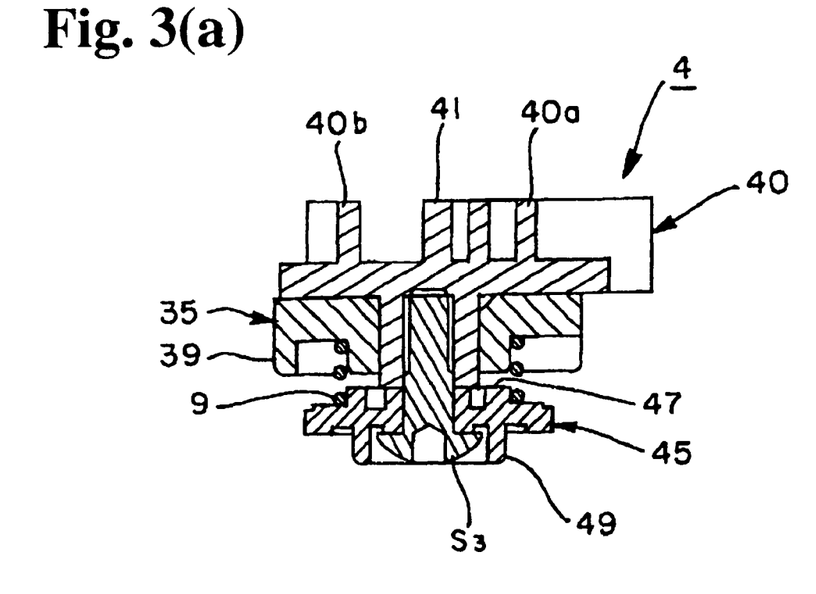
FIG. 3(a) is a sectional view taken along line 3(a)-3(a) in FIG. 1.
Figure 3B:
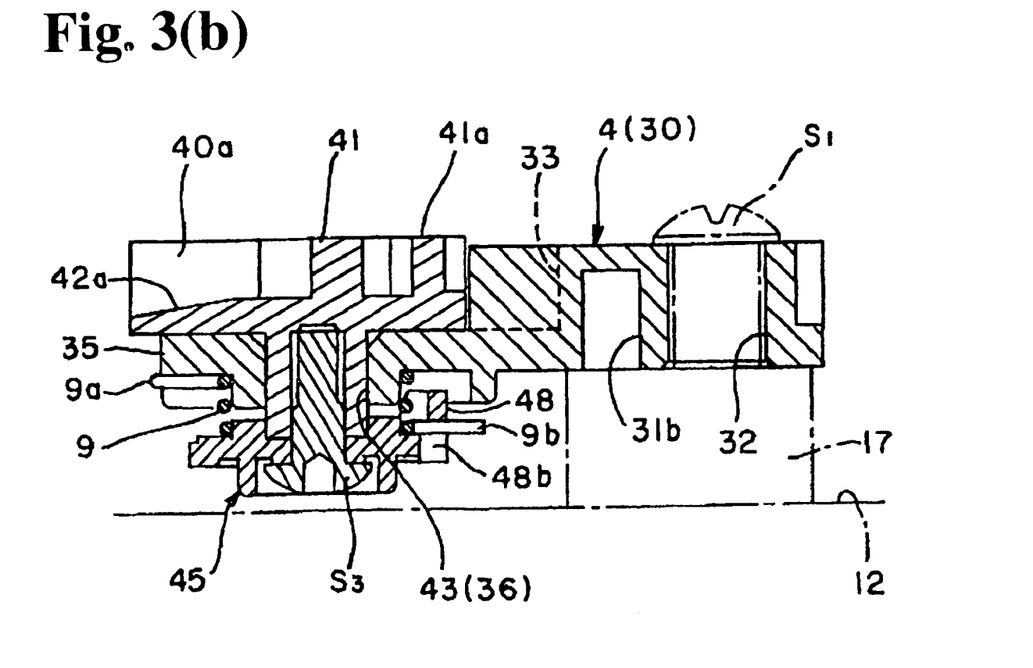
FIG. 3(b) is a sectional view taken along line 3(b)-3(b) in FIG. 1.
Figure 4:
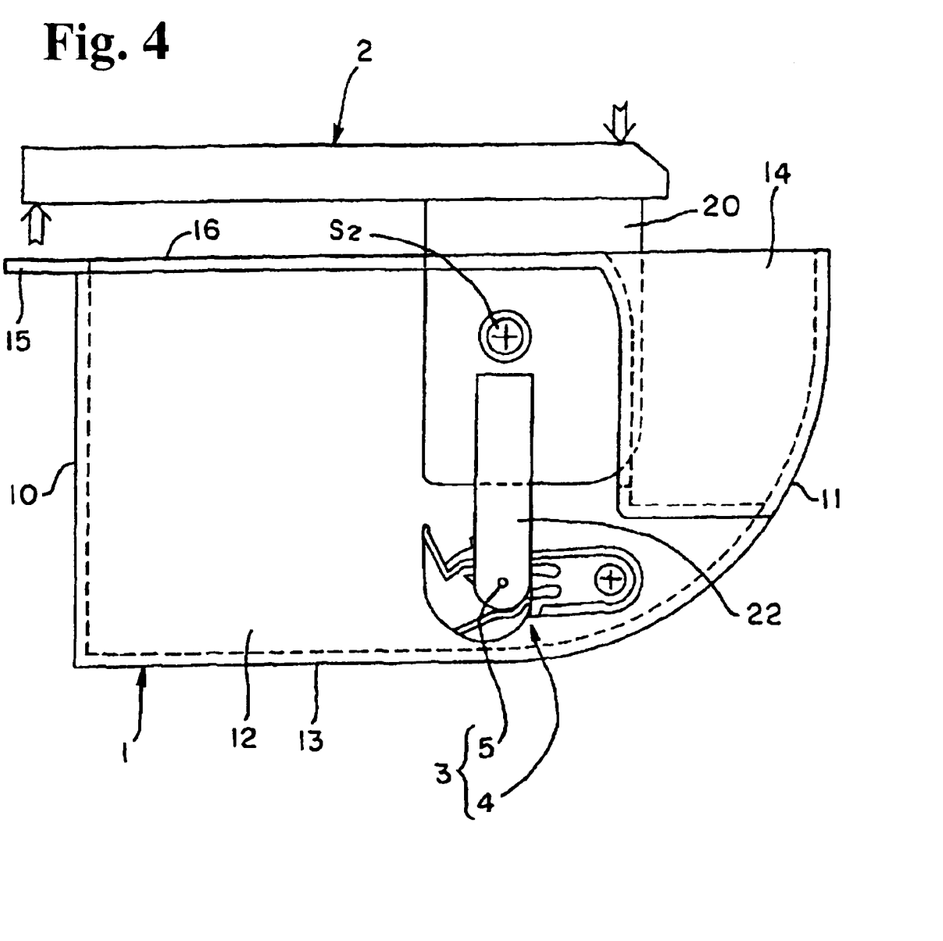
FIG. 4 is a side view of one side showing an opening and closing apparatus using the above latch device in the cover-closed state.
Figure 5:
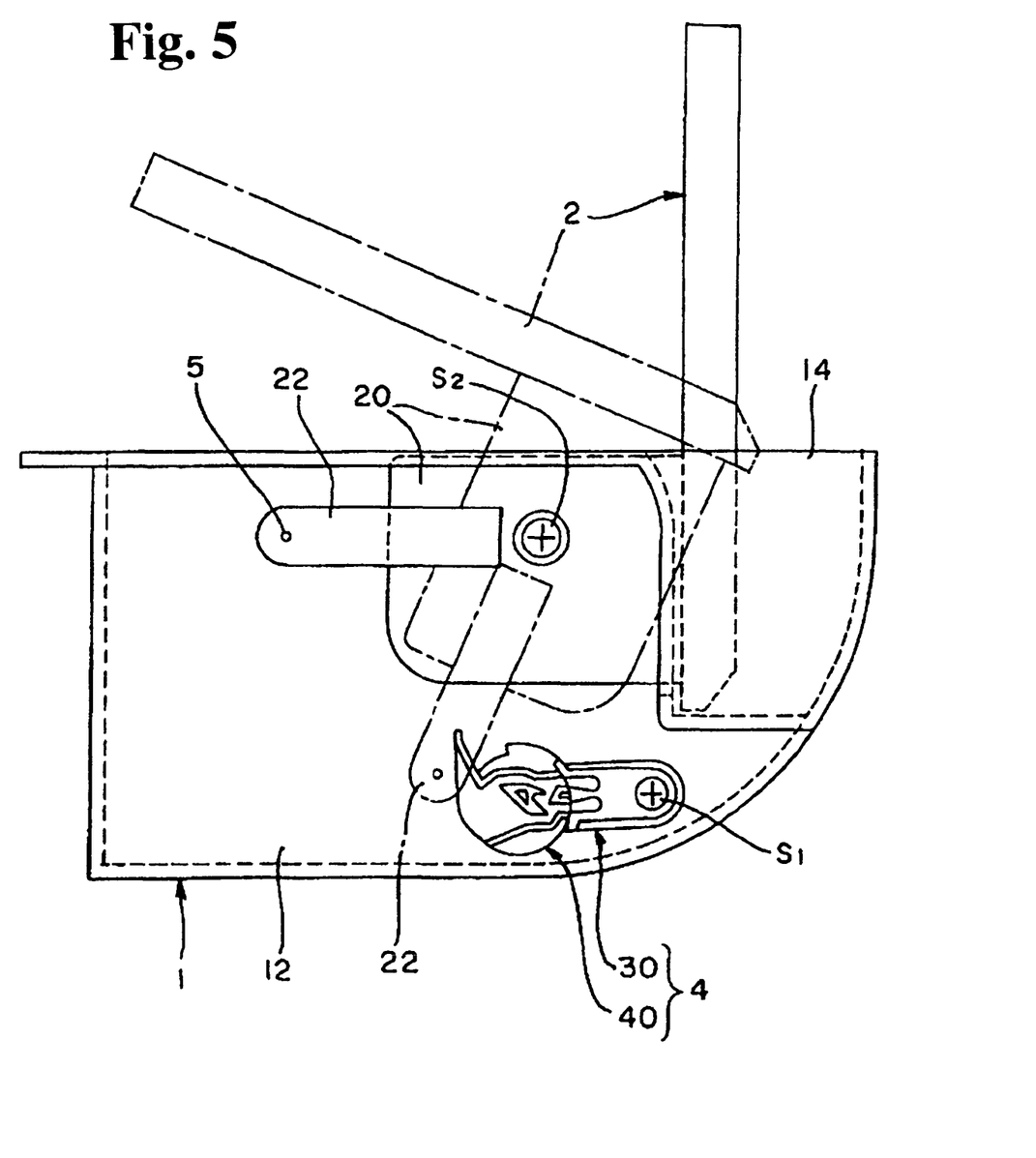
FIG. 5 is a side view of one side showing the above opening and closing apparatus in the cover-open state.
Figure 6:
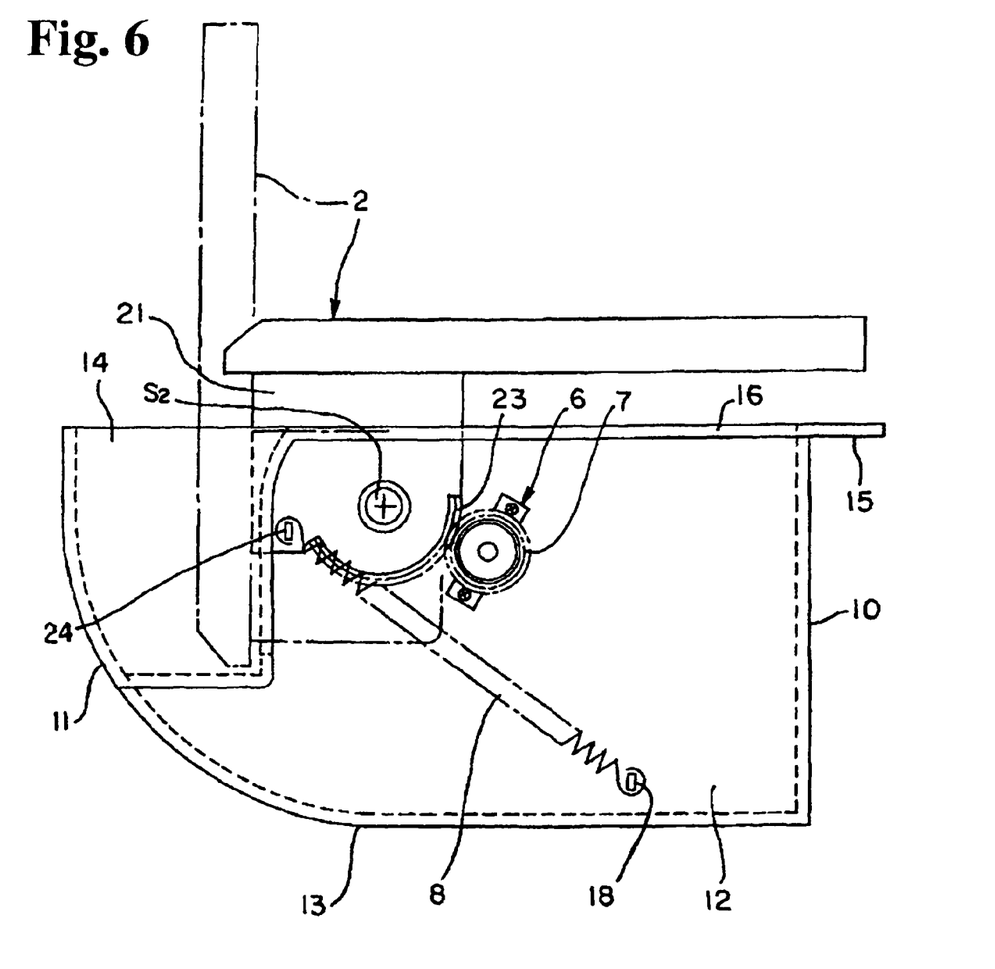
FIG. 6 is a side view of the other side showing the above opening and closing apparatus in the cover-closed state.

Preferred embodiments of the present invention are explained with reference to the attached drawings. FIG. 1 to FIG. 3(b) show the detailed parts of the latch device, FIG. 4 to FIG. 6 show a cover opening and closing apparatus using that latch device, FIGS. 7(a), 7(b) and FIGS. 8(a), 8(b) show the operation of the latch device when applying the improper excessive load on the opening and closing apparatus, and FIG. 9(a) to FIG. 11(d) are unit drawings showing the main constituent members of the latch device. In the explanation below, it is described in detail in the order of cover opening and closing apparatus, latch device, its assembly and operation.

As to the opening-closing apparatus, the opening and closing apparatus of the embodiments, as shown in FIG. 4 to FIG. 6, is an example in which it switches a cover 2 on a main body 1 between a closed position closing an opening on the side of the main body in FIG. 4 and an open position fully opening the opening on the side of the main body in FIG. 5, and locks to be capable of releasing via a latch device 3 comprising a cam member 4 and a pin member 5 of the present invention in opposition to the impelling force in the closed position.

Here, the main body 1 has a container shape with the inside being demarcated by front and rear walls 10, 11, two side walls 12, and a bottom wall 13, and the like, and the top being open. Flange-shaped upper flange parts 15, 16 are provided on the front wall 10 and the two side walls 12. Behind the two side walls 12, there are provided overhanging parts 14 which overhang one step in the space with the rear wall 11, and the inside and outside are connected through openings on corresponding parts of the flange parts 16 and on the front end faces of the overhanging parts 14. Also, on one side wall 12 there is provided an attachment part 17 which becomes one step higher as in FIGS. 3(a), 3(b), and a cam member 4 serving as the main part of a latch device 3 to be described later is attached to that attachment part 17 via a screw member S1, or the like.

On the other side wall 12 there is provided a recessed part (not shown), and a damper 6 is attached to that recessed part, and there is provided a hooking part 18 for an impelling spring. The damper 6, for example, comprises a well-known rotary type oil damper, or the like, and it has an output shaft which receives resistance of operating oil filled in the main body and a rotating gear 7 which is installed on that output shaft. Also, the damper 6 is attached by a screw, or the like, in a state in which the main body is positioned and placed in the recessed part of the other side wall 12. However, this damper 6 also may be omitted.

The cover 2 has a rectangular plate shape, and supporting arms 20, 21 placed protruding on both sides. On each arm 20, and 21 an attachment hole (not shown) is provided on the same axis. Also, on one arm 20 a rocking piece 22 is installed further down from said attachment hole. The rocking piece 22 has a pin member 5 which is placed protruding on the inner face on the side of the leading end and couples and decouples with the latch device 3. On the other arm 21 there is formed an arc-shaped gear part 23, and there is provided a hooking part 24 for an impelling spring. The gear part 23 is an arc centered on said attachment hole, and it is made capable of engaging with the rotating gear 7 of the damper 6.

Also, the cover 2 is assembled onto the main body 1 to be capable of rotation, with the arms 20, 21 on the two sides being projected from inside the main body to outside, that is, outside of the side walls 12, through the openings of said flange parts 16 and the openings on the front end faces of the overhanging parts 14, and by fixing screws S2 for each hinge from the attachment hole of the arm 20 or the attachment hole of the arm 21 to the corresponding part of the side wall. At that time, the gear part 23 on the side of the arm 21 is combined with the rotating gear 7. After that, one end of the impelling spring 8 is fixed to the hooking part 24 on the side of the arm 21, and the other end is pulled toward the direction to increase the impelling force and is fixed to the hooking part 18 on the side of the main body side wall 12.

In the above assembled state, the cover 2 is switched to rotate between the closed position closing the opening of the main body 1 as shown by the solid lines in FIG. 4 and FIG. 6 and the open position fully opening the opening of the main body 1 as shown by the solid line in FIG. 5 and the imaginary line in FIG. 6. In the closed position, the cover 2 is locked via the latch device 3, that is, the coupling of the pin member 5 and the cam member 4, in opposition to the impelling force of the impelling spring 8. When switching the cover 2 to the open position, the front side of the cover 2 is pushed downward (this becomes an operation of further pushing the cover 2 from the closed position toward the same direction, that is, the closed direction) and let go. Doing thus, the above-described pin member 5 is decoupled from the cam member 4, after which the cover 2 is rotated toward the open direction by the impelling force of the impelling spring 8. In the process of that rotation, the cover 2 is subject to damping by the damper 6 via the engagement between the gear part 23 and the rotating gear 7.

As to the latch device, the above latch device 3, as shown in FIG. 1 to FIG. 7(b), is a push-push type, which has a cam member 4 and a pin member 5 which couples and decouples with the cam member 4, respectively being provided in correspondence on a cover 2 and a main body 1, and locks the cover 2 in a closed position of the main body 1 via the coupling of the pin member 5 on the cam member 4, and releases said coupling by pushing from that closed position and then releasing that pushing force to enable switching toward the opening direction. As the latch device 3, for example, if it is an embodiment in which the cover 2 is impelled toward the closing direction of the main body 1, it also may be a manner of use such as to lock in the open position of the main body 1 via the coupling of the pin member 5 on the cam member 4 by pushing toward the opening direction in opposition to the impelling-force, and releasing said coupling by pushing toward the same direction from that open position and then releasing that pushing force to switch toward the closing direction.

Here, the pin member 5 is placed projecting on the rocking piece 22 as mentioned above. The cam member 4 has a base 30 which is attached to the main body side wall 12 corresponding to the pin member 5, a divided body 40 which is supported on the base 30 to be capable of movement having formed at least a place including a locking recessed part which couples with the pin member 5, a linkage plate 45 which is linked to the divided body 40, a movement restricting means (recessed part 37 and protruding part 44) which enables moving the divided body 40 from a normal position on the base 30 when receiving a load at or above a fixed value, and an impelling means 9 which enables returning the divided body 40 again to the normal position after releasing the coupling with the pin member 5.

Figures 9A, 9B:
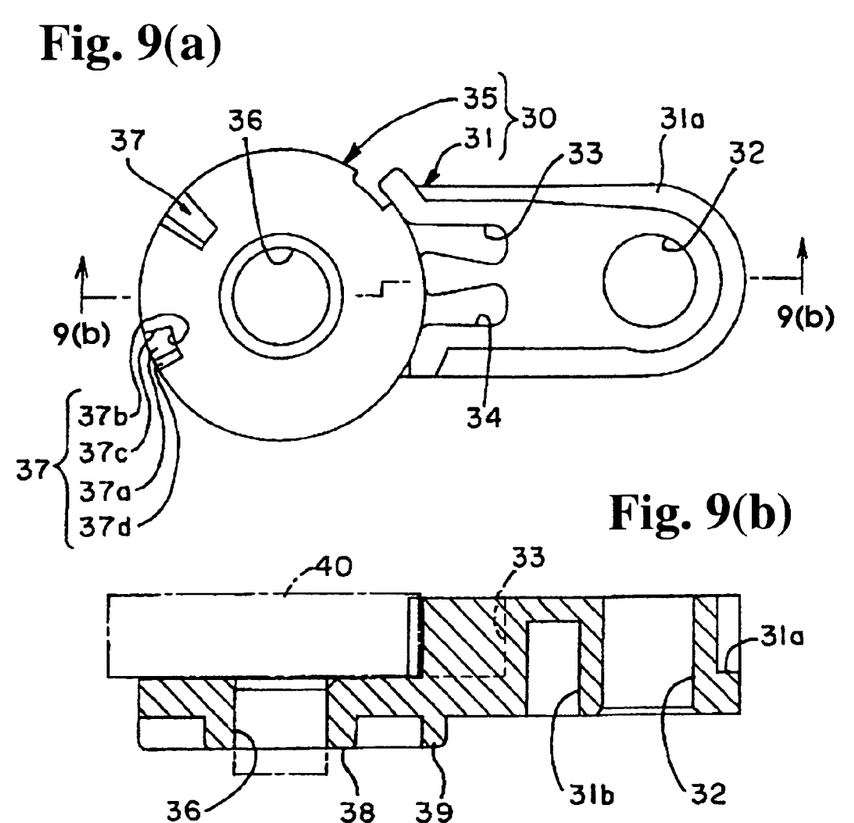
FIG. 9(a) is a top view.
FIG. 9(b) is a sectional view taken along line 9(b)-9(b) in FIG. 9(a)
Figure 9C:
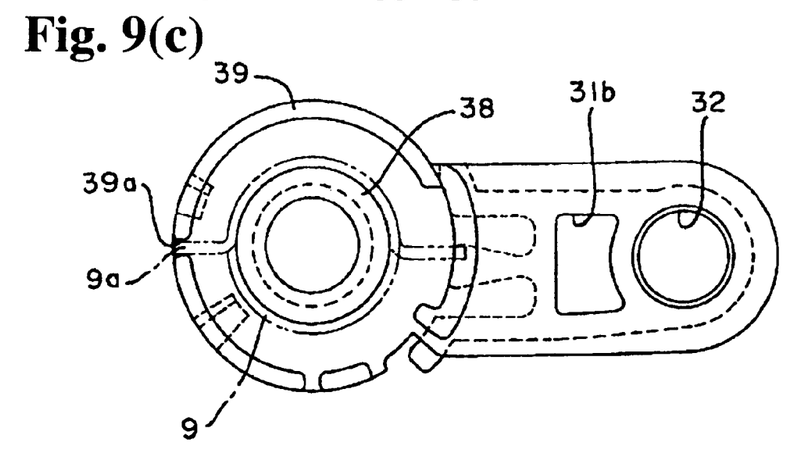
FIG. 9(c) is a bottom view.

The base 30, as shown in FIGS. 9(a) to 9(c), comprises a lever part 31 and a holding part 35 for supporting the divided body which is integrated on the leading end of that lever part 31. The lever part 31 is formed to a step 31a one step lower on the upper perimeter part excluding the side of the holding part 35, and it has an attachment hole 32 which is punched vertically being provided in the place higher than the step 31a, two escape slots 33, 34 which are provided on the side of the holding part 35, and a cut-out part 31b which is placed going inward between the attachment hole 32 and the escape slots 33, 34. The holding part 35 is about donut shaped, and is formed on the upper face lower than the upper face of the lever part 31 by an amount comparable to the divided body 40, and it has a support hole 36 which is punched vertically being provided in the center.

On the upper face of the holding part 35, recessed parts 37 constituting the movement restricting means are formed in two places. Each recessed part 37, in FIG. 9(a), is demarcated by an inner bottom face 37a, a circumferential end face 37b concentric with the support hole 36, and opposing end faces 37c and 37d which are placed facing each other in the circumferential direction. Also, of the opposing end faces 37c and 37d, the opposing end face 37c positioned in the clockwise direction is formed as a face about orthogonal to the inner bottom face 37a, and the opposing end face 37d positioned in the counterclockwise direction is formed as sloping face at a prescribed angle to the inner bottom face 37a.

Meanwhile, on the bottom face of the holding part 35, there are provided a boss part 38 which is placed protruding so as to border the support hole 36, and a boss part 39 which is placed protruding so as to border the outer perimeter of the bottom face, and the like. Also, the boss part 39 has a slit 39a for spring fixing provided in a part. Also, in this structure, a coil spring being the impelling means 9 is disposed on the outer perimeter of the boss part 38, and one end 9a disposed on the upper side is fixed to the slid 39a on the side of the boss part.

On the divided body 40, as shown in FIGS. 10(a) to 10(d), there are formed vertical wall parts 40a, 40b which are placed protruding maintaining a gap therebetween on the upper face, a heart-shaped island or protruding part 41 which is placed protruding between the vertical wall parts 40a, 40b and a secondary protruding part 41a which is placed protruding maintaining a gap with the right side of that protruding part 41, a cam groove 42 which is traced by the pin member 5, a shaft part 43 which is placed projecting in about the center of the bottom face and runs through the support hole 36 on the side of the base, and a protruding part 44 which is placed protruding in two places on the bottom face constituting the movement restricting means together with the recessed part 37.

Figure 10:
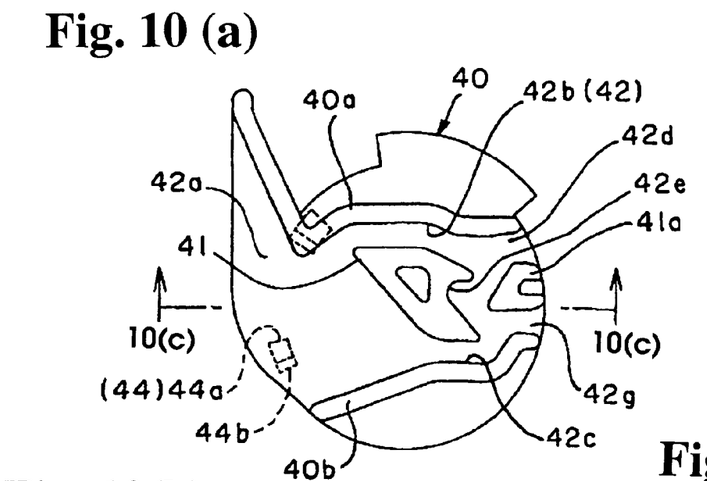
FIG. 10(a) is a top view.
FIG. 10(b) is a right side view.
FIG. 10(c) is a sectional view taken along line 10(c)-10(c) in FIG. 10(a)
FIG. 10(d) is a bottom view.
Figure 10B:
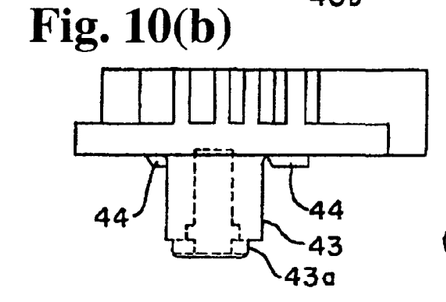
Figure 10C:
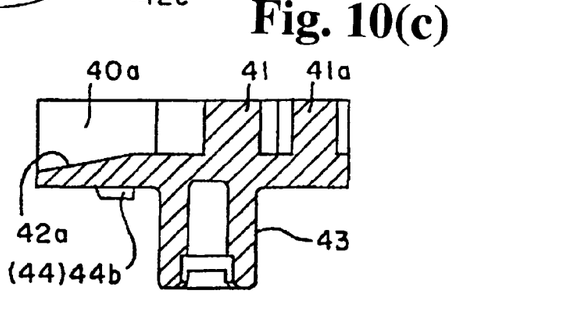
Figure 10D:
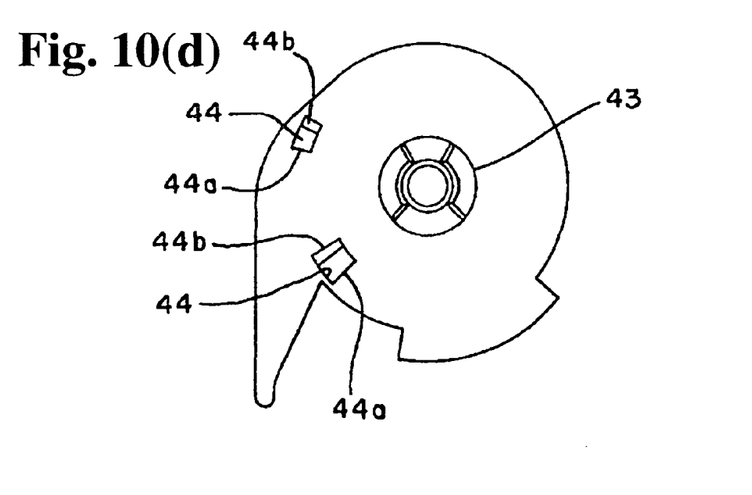
Figure 11A:
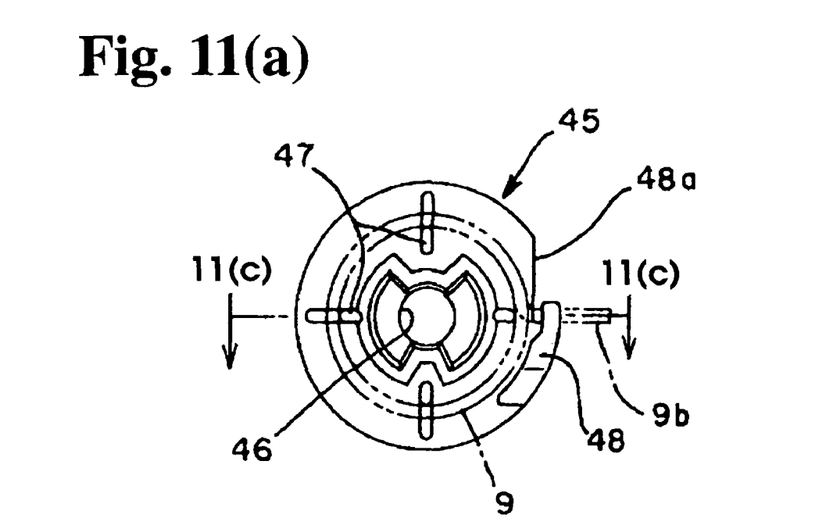
FIG. 11(a) is a top view.
Figure 11B:
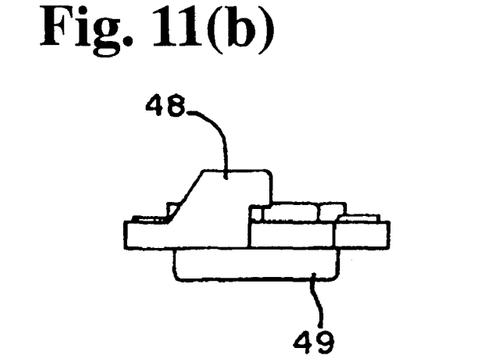
FIG. 11(b) is a right side view.
Figure 11C:
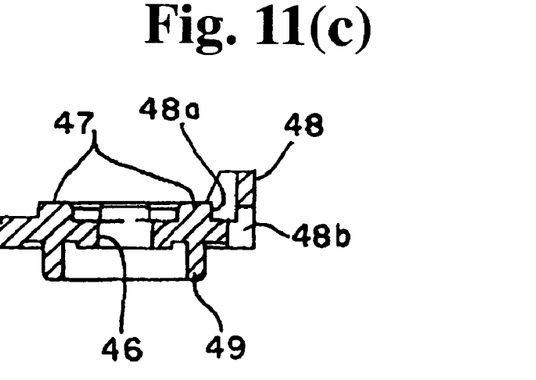
FIG. 11(c) is a sectional view taken along line 11(c)-11(c) in FIG. 11(a)
Figure 11D:
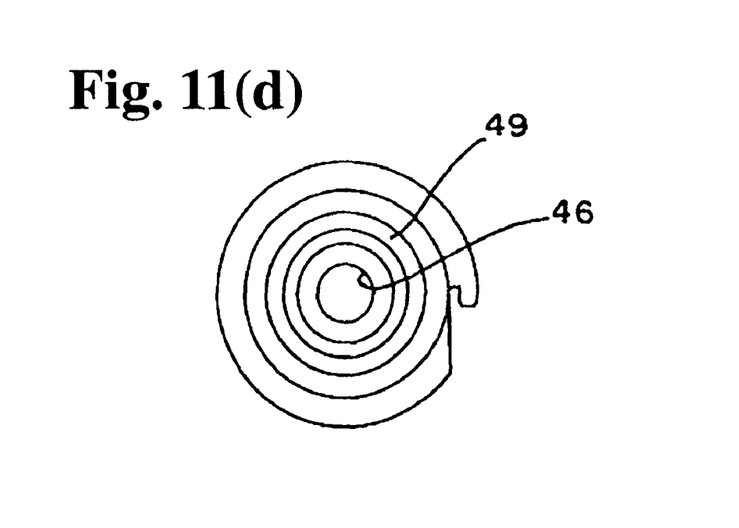
FIG. 11(d) is a bottom view.

In FIGS. 10(a), 10(c), the cam groove 42 is constituted, in the space between the vertical wall parts 40a, 40b, by an entrance-exit channel 42a which is positioned on the left and slopes widely and lowly toward the corresponding perimeter part, a forward channel 42c between the protruding part 41 and the vertical wall part 40b, a return channel 40b between the protruding part 41 and the vertical wall part 40a, an extended channel 42g between the vertical wall part 40b and the secondary protruding part 41a which extends further from the forward channel 42c on the right side of the protruding part 41, a locking recessed part 42e which connects through to the extended part 42g on the right side of the protruding part 41, and an extended channel 42d which is positioned between the vertical wall part 40a and the secondary protruding part 41a extending further from the return channel 42b on the right side of the projection 41 and connects through also with the locking recessed part 42e, and the like. The extended channel 42d and the extended channel 42g are set so as to be continuous with the escape slot 33 and the escape slot 34 on the base side when the divided body 40 is assembled onto the holding part 35 on the side of the base and it is in the usual normal position.

The shaft part 43 is set to a diameter and height so as to run through the support hole 36 on the side of the base to rotate freely, and the leading end 43a is formed in a non-circular shape, and it has a damping hole which is placed going inward from the leading end. Each protruding part 44 has such a size that fits into the corresponding recessed part 37 on the side of the holding part, and of the two opposing end faces facing opposite in the circumferential direction. The opposing end face 44a position in the clockwise direction is formed as a face about orthogonal to the bottom face of the holding part, and the opposing end face 44b positioned in the counterclockwise direction is formed as a sloping face at a prescribed angle to the bottom face of the holding part. Therefore, the movement restricting means is supported on the holding part 35 of the divided body 40 via the fitting together of the support hole 36 and the shaft part 43, and each protruding part 44 fits in the recessed part 37 in the state when disposed in the normal position.

The linkage body 45, as shown in FIGS. 11(a) to 11(d), is roughly disk shaped, and it has an attachment hole 46 in the center, spring positioning parts 47 which are placed projecting on the upper face in plural places on a circle centered on the attachment hole 46, a protruding piece part 48 which has a part of the perimeter cut out and is placed protruding maintaining a gap on the cut-out part 48a and has a fixing part 48b formed on the bottom side, and a recessed boss part 49 centered on the attachment hole 46 on the bottom face.

As to the assembly, the shaft part 43 is inserted into the support hole 36, and then the coil spring being the impelling means 9 is disposed on the outer perimeter of the boss part 38 in which state one end 9a is fixed in the slit 39a on the side of the boss part, and from that state, the linkage body 45 is coupled to the leading end 43a of the shaft part. Furthermore, the screw member S3 is screwed into the cylinder of the shaft part 43 from the attachment hole 46, whereby the above-mentioned divided body 40 is supported on the holding part 35 on the side of the base to be capable of rotation. Also, the other end 9b of the impelling means 9 is fixed to the fixing part 48b of the protruding piece part 48 in a state expressing a prescribed impelling force in the coil spring (initial impelling force), whereby when the protruding part 44 comes out from the recessed part 37 by a counterclockwise load as in FIGS. 7(a), 7(b) and FIGS. 8(a), 8(b) and then that load is released, the divided body 40 is made capable of returning to the normal position by the initial impelling force of said impelling means 9 and the impelling force accumulated accompanying the counterclockwise rotation. Also, in this structure, as is inferred from FIG. 3(b), it is made such that the coil spring being the impelling means 9 impels the linkage plate 45 toward the direction of moving away from the holding part 35, whereby the divided body 40 is impelled toward the side of the holding part 35 and the play in the axial direction also is absorbed.

As to the operation, the basic operation in the case of using the above latch device 3 as a cover opening and closing apparatus is as follows.

(a) The cover 2 is rotationally operated (push operated) from the open position shown by the solid line in FIG. 5 and the imaginary line shown in FIG. 6 toward the closed direction in opposition to the impelling force of the impelling spring 8. Doing thus, when the cover 2 is further rotated past the position shown by the imaginary line in FIG. 5, the pin member 5 on the side of the rocking piece goes inside the cam groove 42 from the above-mentioned entrance-exit channel 42a to the forward channel 42c and reaches the extended channel 42g beyond. When the hand is removed from the cover 2 (the pushing force is released), the pin member 5 goes from the extended channel 42g and couples into the locking recessed part 42e (see FIG. 1). The cover 2 is locked in the closed position shown in FIG. 4 by that coupling.

(b) When the cover 2 is again switched to the open position, the cover 2 is pushed toward the closed direction from the state in FIG. 4, and when that pushing force is released, the cover 2 is automatically rotated toward the open direction by the impelling force of the impelling spring 8 while being damped by the damper 6. At that time, the pin member 5 goes from the above locking recessed part 42e past the extended channel 42d for releasing, the return channel 42b, and the entrance-exit channel 42a and is removed from the cam member 4.

Also, in the case when an excessive load in the so-called a forcing direction is received, due to forcefully pushing the hinge side of the cover 2 or operation forcefully prying open the open end side of the cover 2, as shown by the arrow in FIG. 4, in the locked state of the cover 2, that is, the state when the pin member 5 is coupled in the locking recessed part 42e of the cam member 4, the operation is as follows.

(c) When the divided body 40 receives an excessive load at or above a set value via the pin member 5 in the state when coupled with the pin member 5, the cam member 4 releases the coupling with the pin member 5 with accompanying rotation toward a direction of absorbing that load. That is, when the divided body 40 receives a load (counterclockwise load) at or above a preset value via the pin member 5 due to the improper excessive load operation, it is rotated on the base 30 toward the direction of the arrow shown in FIG. 7(b) and FIG. 8(b). In the course of this rotation, the divided body 40 is rotated counterclockwise while the above-mentioned sloping faces of the opposing end faces 44b of the respective protruding parts 44 ride up (release coupling) on the sloping faces of the opposing end faces 37d of the recessed parts 37, and impelling force is accumulated in the above-mentioned impelling means 9.

Figure 7A:
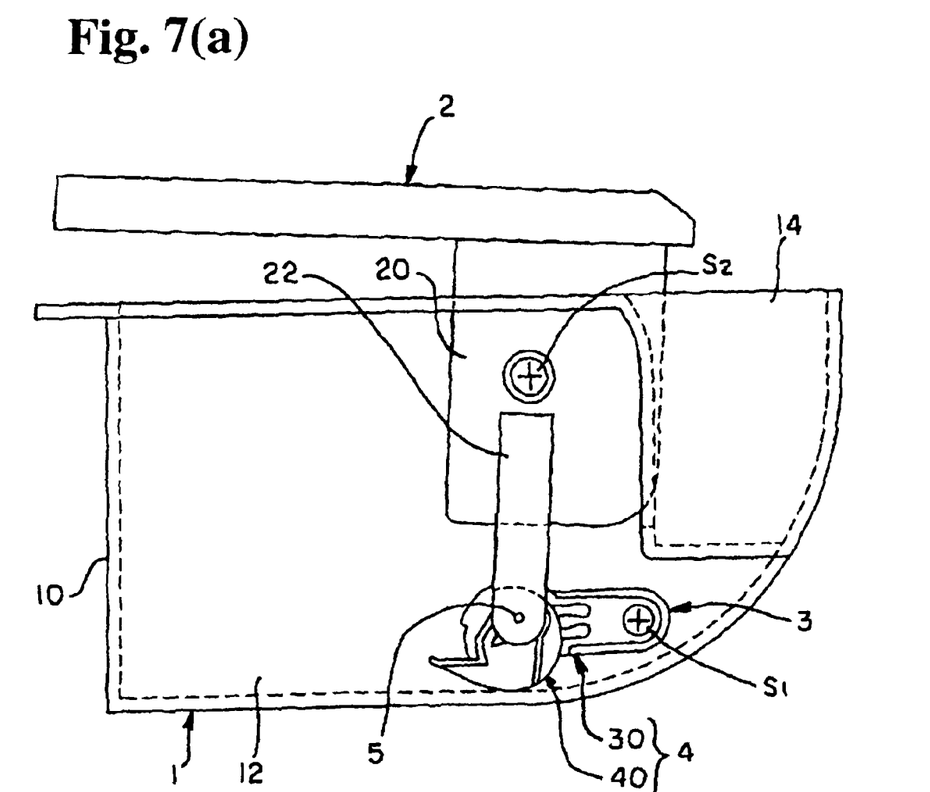
FIGS. 7(a), 7(b) are side views of the above opening and closing apparatus in the initial process of applying improper excessive load and a state showing the latch device.
Figure 7B:
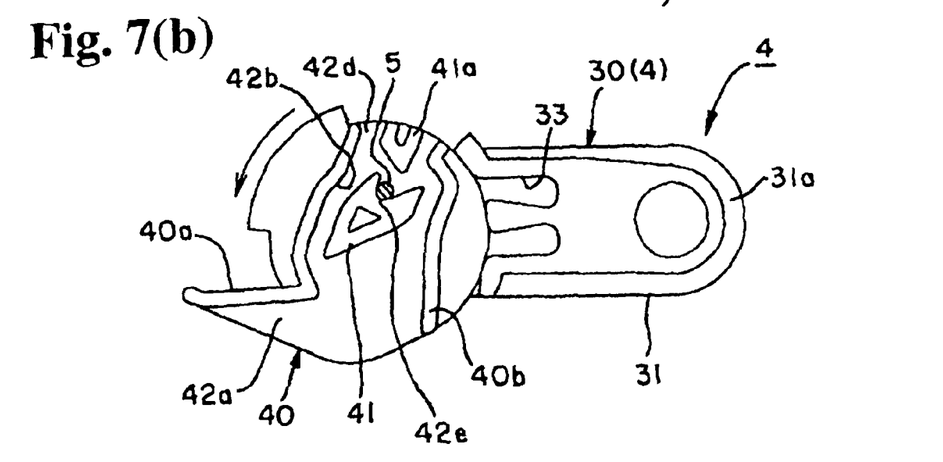
Figure 8A:
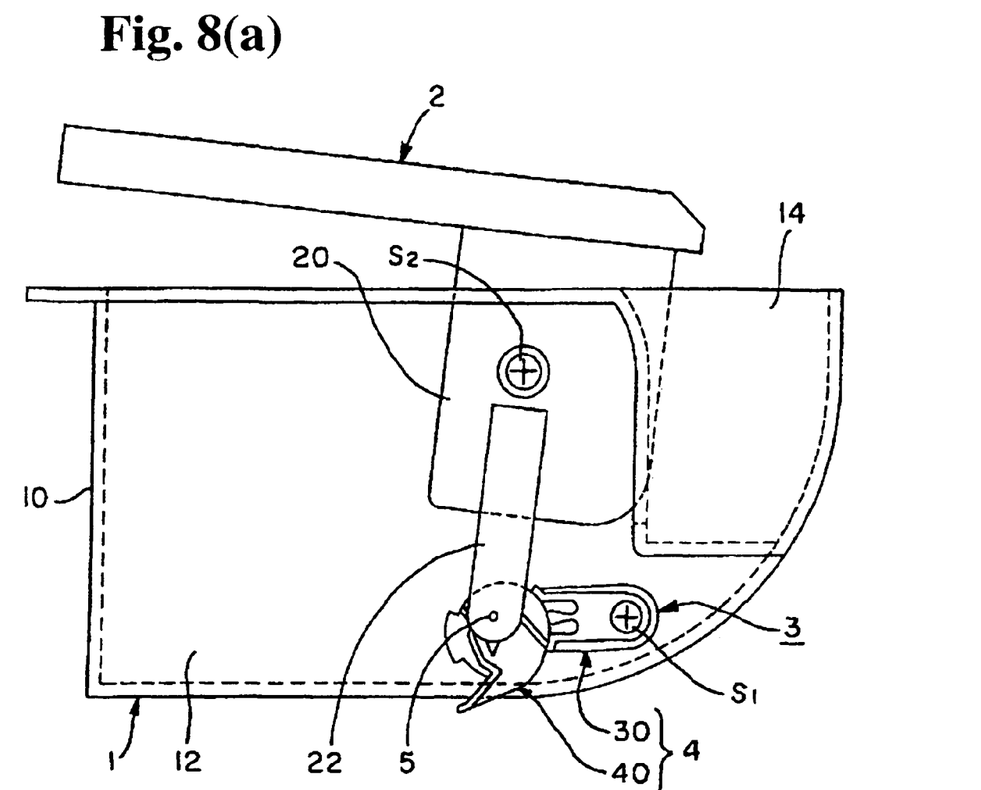
FIGS. 8(a), 8(b) are side views of the above opening and closing apparatus in the final process of applying the improper excessive load and a state showing the latch device.
Figure 8B:
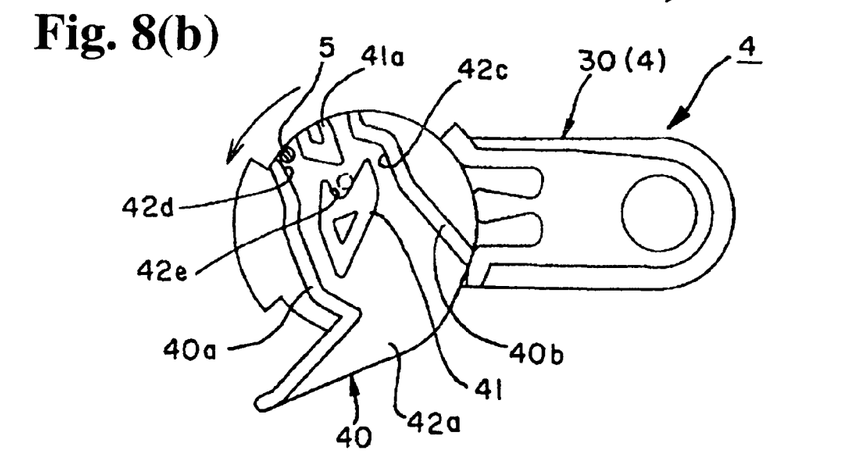

(d) Also, when the divided body 40 is rotated from a condition shown in FIGS. 7(a), 7(b) to a condition slightly before FIGS. 8(a), 8(b), the pin member 5 is decoupled from the locking recessed part 42e. When the divided body 40 is further rotated, the pin member 5 goes through the extended channel 42d and is removed from the cam member 4 (divided body 40). Doing thus, the divided body 40 is rotated clockwise by the impelling force of the impelling means 9, and it is returned to the normal position having the respective protruding parts 44 fitted into the corresponding recessed parts 37 on the holding part 35. By this, in this structure, compared with the conventional countermeasure for the improper excessive load, there is no deformation, breakage or falling off of the pin member, and furthermore because an uncomfortable noise also is not caused, and therefore the quality and reliability can be improved.

(e) The divided body 40 is made such that even if it receives a clockwise load in the normal position, it is not unexpectedly rotated clockwise, because of the contact between the respective orthogonal end faces of the protruding parts 44 and the recessed parts 37. That is, in this structure, the movement restricting means has a constitution which satisfies a condition that it "enables returning the divided body to the normal position when it receives a load at or above said fixed value," by setting of the shape of the protruding part 44 and the recessed part 37 and by setting of the impelling force of the impelling means 9. Therefore, adjustment of a threshold for the improper excessive load is easy.

The disclosure of Japanese Patent Application No. 2007-049066 filed on Feb. 28, 2007, is incorporated as a reference.

While the invention has been explained with reference to the specific embodiments of the invention, the explanation is illustrative and the invention is limited only by the appended claims.

What is claimed is:

1. A push-push latch device provided between a movable body and a main body, comprising:
   a cam member adapted to be attached to one of the movable body and the main body, and
   a pin member adapted to be attached to the other of the movable body and the main body for coupling and decoupling with the cam member, said pin member having a coupling position with said cam member and a decoupling position with the cam member according to a movement of the movable body relative to the main body,
   wherein said cam member includes a base, and a divided body rotationally supported on the base and having a locking part for coupling with the pin member so that when said divided body receives a load above a predetermined value through said pin member in the coupling position, the divided body moves to release forcible coupling of said pin member with the cam member to absorb the load, and wherein said cam member further includes a movement restricting device for moving said divided body from a normal position when receiving said load above the predetermined value, an impelling device for urging the divided body moved from the normal position to return again to the normal position after releasing the coupling with the pin member, a support hole provided on the base, a shaft part projecting from a bottom face of the divided body and passing through the support hole, and a linkage plate fixed on a leading end side of the shaft part so as to rotate along with the shaft part, said impelling device being disposed between a bottom face of said base and the linkage plate for impelling the divided body toward the base to absorb play in an axial direction of the shaft part and enabling said divided body to return again to said normal position after releasing the coupling with said pin member.

2. An opening and closing apparatus comprising the latch device according to claim 1 for switching the movable body on the main body to an open position or a closed position by a push operation in opposition to an impelling force in mid course and locking in the closed position through the latch device.

3. The opening and closing apparatus according to claim 2, wherein the latch device locks the movable body in a first position of the main body via a coupling of the pin member and the cam member, and releases said coupling by pushing from the first position and releasing a pushing force to switch to a second position.

4. A push-push latch device provided between a movable body and a main body, comprising:

a cam member adapted to be attached to one of the movable body and the main body, and a pin member adapted to be attached to the other of the movable body and the main body, said pin member engaging with or disengaging from the cam member according to a movement of the movable body relative to the main body, wherein the cam member comprises a base, a divided body rotationally supported on the base and having a locking part for coupling with the pin member, and an impelling device for rotating the divided body to a normal position with respect to the base, and wherein said divided body is arranged to the base such that in a situation where the pin member engages the locking part in the normal position, when the divided body receives a load above a predetermined value through said pin member, the divided body rotates by the load against a force of the impelling device to release the pin member with the cam member to absorb the load, the divided body being returned to the coupling position by the impelling device when the load is removed;

wherein the divided body further includes wall parts spaced apart from each other to define a channel therebetween, said channel having the locking part therebetween and openings on two sides, said openings being arranged in a predetermined direction in the normal position and rotated in a direction perpendicular to the predetermined direction when the divided body received the load above the predetermined value; and wherein said base includes escape slots communicating with the channel in the normal position for allowing the pin to temporarily enter therein.

5. A push-push latch device provided between a movable body and a main body, comprising:

a cam member adapted to be attached to one of the movable body and the main body, and a pin member adapted to be attached to the other of the movable body and the main body, said pin member engaging with or disengaging from the cam member according to a movement of the movable body relative to the main body, wherein the cam member comprises a base, a divided body rotationally supported on the base and having a locking part for coupling with the pin member, and an impelling device for rotating the divided body to a normal position with respect to the base, and wherein said divided body is arranged to the base such that in a situation where the pin member engages the locking part in the normal position, when the divided body receives a load above a predetermined value through said pin member, the divided body rotates by the load against a force of the impelling device to release the pin member with the cam member to absorb the load, the divided body being returned to the coupling position by the impelling device when the load is removed;

wherein one of the base and the divided body includes a protruding part, and the other of the base and the divided part includes a recessed part receiving the protruding part in the normal position; and wherein said cam member further includes a support hole provided on the base, a shaft part projecting from a bottom face of the divided body and passing through the support hole, and a linkage plate fixed on a leading end side of the shaft part so as to rotate along with the shaft part.

6. The latch device according to claim 5, wherein said impelling device is disposed between a bottom face of said base and the linkage plate for impelling the divided body toward the base to absorb play in an axial direction of the shaft part and enabling said divided body to return again to said normal position after releasing the coupling with said pin member.

* * * * *